Patented May 23, 1939

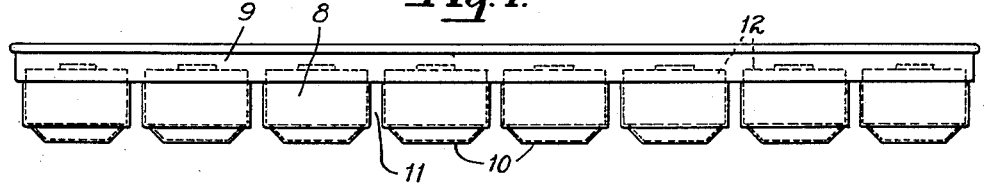
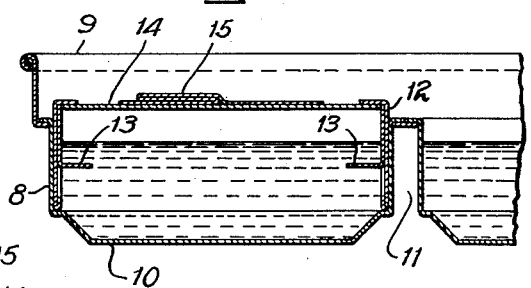
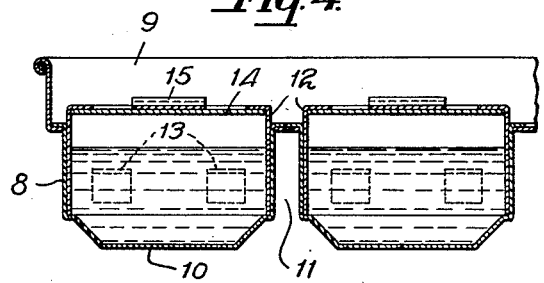
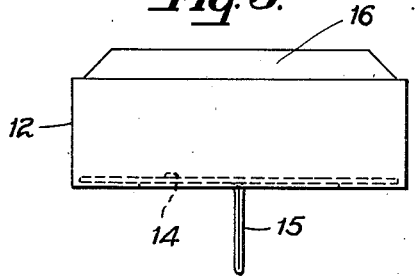
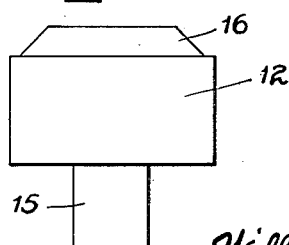

2,159,338

UNITED STATES PATENT OFFICE 2,159,338

APPARATUS FOR FORMING CONFECTIONS

William J. Murphy, Crafton, Pa.

Application February 25, 1938, Serial No. 192,538

3 Claims. (Cl. 107—19)

My invention relates to apparatus for the manufacture of confections, and particularly frozen confections such as ice cream, sherbets, etc.

As herein described, the invention is employed in the making of confections for sale in individual containers of cardboard or the like, and has for its object the provision of means whereby such confections can be produced conveniently and economically.

As shown in the accompanying drawing, Figure 1 is a side view of a tray for receiving the containers and the material to be frozen; Fig. 2 is a fragmentary plan view thereof; Fig. 3 is an enlarged view taken on the line III—III of Fig. 2; Fig. 4 is a view taken on the line IV—IV of Fig. 3; Fig. 5 is a side view of a container with the confection frozen therein, and Fig. 6 is an end view thereof.

The apparatus comprises a sheet metal tray 8 having a rim portion 9 disposed peripherally thereof and welded or otherwise suitably secured to the body portion of the tray. The bottom portion of the tray has depressions 10 formed therein in spaced-apart relation so as to provide channel-like passageways 11 along which refrigerant fluid may flow.

Containers 12 are formed of cardboard or the like, and are shown in Figs. 3 and 4 as in inverted position. The containers have end walls with two layers of cardboard, the inner layer being struck out to form tongues 13 that serve to prevent the ice cream from accidentally falling out of the container when the cream is being eaten, and to facilitate removal of the container and the frozen body of ice cream from the tray. The containers are further provided with loosely supported bottoms 14 that may be pushed upwardly by the user to eject gradually the ice cream from the container. The bottom 14 has a cardboard tongue 15 glued thereto which can be raised from its folded position of Fig. 3 into an upright position, to serve as a handle by which the container can be removed from the tray. In practice the tongues will all be bent to upright position at the completion of a freezing operation, and a number of them gripped simultaneously by elongated rubber-faced tongs so as to avoid the necessity of removing the containers one by one. The consumer will use the tongue 15 as a convenient means for holding the container in an upright position, and as he eats the ice cream he can force the bottom 14 upwardly, the tongues 13 being thereby flexed to permit ejection of the cream.

A preliminary step in the making of the confections involves the filling of the cup-like depressions in the tray 8 to a suitable level. As shown in Fig. 3, these pockets are only about three-fourths filled, leaving room for expansion of the confection during freezing, without displacing the container 14. For more rapid operation and to avoid the necessity of filling each container compartment individually, the liquid confection can be filled to a level above the channels 11 so that the quantity at all portions of the tray will be equalized and the frozen box be of uniform quantity.

In either event, the containers 14 are placed in the pockets of the tray in an inverted position with their lower edges extending into the liquid confection. The tray is then placed in or moved through a body of brine or other refrigerant fluid, and the confection is quickly frozen, because the refrigerant will have contact with all side walls and the bottom walls of the cup-like depressions.

At the completion of a freezing operation, the tray can be set in warm water for a few seconds so that the containers 14 can readily be removed. The containers 14 and the lowermost portions of the depressions 10 together form molds for the confection, and the confection when removed will extend above the walls of the container as indicated at 16, and this portion may be dipped in chocolate or other coating material if desired.

I claim as my invention:

1. Freezing apparatus for making molded articles, comprising a tray having a liquid receiving depression formed in its bottom wall, of the general configuration of the articles to be frozen therein, and forming portions of the mold walls for the articles, and a container mounted in inverted position in said depression to form other portions of the mold walls, and having vertical side walls which closely fit the side walls of said depressions, the said vertical walls extending below the liquid level in the depression, to points adjacent the bottom of the depression, and retaining elements carried by and projecting inwardly from the side walls of the container.

2. Freezing apparatus for making molded articles, comprising a tray having a liquid receiving depression formed in its bottom wall, of the general configuration of the articles to be frozen therein, and forming portions of the mold walls for the articles, a container mounted in inverted position in said depression to form other portions of the mold walls, and having vertical side walls which closely fit the side walls of said depression, the said vertical walls extending below the liquid level in the depression, to points adjacent the bottom of the depression, and flexible retaining elements carried by and projecting inwardly from the side walls of the container.

3. Freezing apparatus for making molded articles, comprising a tray having liquid receiving depressions formed in its bottom wall, of the general configuration of the articles to be frozen therein, and forming portions of the mold walls for the articles, containers mounted in inverted position in said depressions, to form other portions of the mold walls, and having vertical side walls which closely fit the side walls of said depressions, the said vertical walls extending below the liquid level in said recesses and to points adjacent to the bottoms of the depressions, and retaining elements carried by and projecting inwardly from said vertical side walls, in each container, the depressions being spaced apart throughout the major part of their depths to provide passageways for refrigerant between adjacent depressions.

WILLIAM J. MURPHY.